(12) United States Patent
Barron et al.

(10) Patent No.: US 7,669,658 B2
(45) Date of Patent: Mar. 2, 2010

(54) HIGH STRENGTH POLYCRYSTALLINE CERAMIC SPHERES

(75) Inventors: Andrew R. Barron, Houston, TX (US); Kimberly A. DeFriend, Santa Fe, NM (US)

(73) Assignee: William Marsh Rice University, Houston, TX (US)

( * ) Notice: Subject to any disclaimer, the term of this patent is extended or adjusted under 35 U.S.C. 154(b) by 222 days.

(21) Appl. No.: 11/612,194

(22) Filed: Dec. 18, 2006

(65) Prior Publication Data

US 2007/0154268 A1 Jul. 5, 2007

Related U.S. Application Data

(62) Division of application No. 10/774,319, filed on Feb. 6, 2004, now Pat. No. 7,220,454.

(60) Provisional application No. 60/445,551, filed on Feb. 6, 2003, provisional application No. 60/445,586, filed on Feb. 6, 2003.

(51) Int. Cl.
*E21B 43/267* (2006.01)
*C01F 7/02* (2006.01)
*C01F 7/04* (2006.01)

(52) U.S. Cl. .................. 166/280.2; 423/625; 423/630

(58) Field of Classification Search ............... 423/625, 423/630; 501/33; 166/280.2
See application file for complete search history.

(56) References Cited

U.S. PATENT DOCUMENTS

| | | | |
|---|---|---|---|
| 4,547,468 A * | 10/1985 | Jones et al. ............ 501/33 |
| 4,744,831 A | 5/1988 | Beck | |
| 4,775,598 A | 10/1988 | Jaeckel | |
| 5,318,797 A | 6/1994 | Matijević et al. | |
| 5,322,821 A | 6/1994 | Brezny | |
| 6,004,525 A | 12/1999 | Tani et al. | |
| 6,136,891 A | 10/2000 | Chopin et al. | |
| 6,207,130 B1 | 3/2001 | Kareiva et al. | |
| 6,936,306 B1 | 8/2005 | Barron et al. | |
| 7,220,454 B2 | 5/2007 | Barron et al. | |

FOREIGN PATENT DOCUMENTS

| WO | 2005021147 A2 | 3/2005 |
|---|---|---|
| WO | 2005021147 A3 | 3/2005 |

OTHER PUBLICATIONS

American Chemical Society, Joint Southeast-Southwest Regional Meeting, http://python.rice.edu/~arb/acs_neworleans2000.htm, Dec. 6-8, 2000, 4 pages.

(Continued)

*Primary Examiner*—Stanley Silverman
*Assistant Examiner*—James Fiorito
(74) *Attorney, Agent, or Firm*—Conley Rose, P.C.; Rodney B. Carroll

(57) ABSTRACT

A method for making hollow spheres of alumina or aluminate comprises: coating polymeric beads with an aqueous solution of an alumoxane, drying the beads so as to form an alumoxane coating on the beads; heating the beads to a first temperature that is sufficient to convert the alumoxane coating to an amorphous alumina or aluminate coating and is not sufficient to decompose the polymeric beads; dissolving the polymeric bead in a solvent; removing the dissolved polymer from the amorphous alumina or aluminate coating; and heating the amorphous alumina or aluminate coating to a second temperature that is sufficient to form a hollow ceramic sphere of desired porosity and strength. The hollow spheres can be used as proppants or can be incorporated in porous membranes.

17 Claims, 14 Drawing Sheets

OTHER PUBLICATIONS

Bailey, Diane A., et al., "Characterization of alumoxane-derived ceramic membranes," Journal of Membrane Science, 2000, pp. 1-9, vol. 176, Elsevier Science B.V.

Callender, Rhonda L., et al., "Aqueous synthesis of water-soluble alumoxanes: environmentally benign precursors to alumina and aluminum-based ceramics," Chem Mater., 1997, pp. 2418-2433, vol. 9, No. 11, American Chemical Society.

Callender, Rhonda L., et al., "Chemical control over ceramic porosity using carboxylate-alumoxane nanoparticles," Advanced Materials, 2000, pp. 734-738, vol. 12, No. 10, Wiley-VCH Verlag GmbH, D-69469 Weinheim.

Callender, Rhonda L., et al., "Facile synthesis of aluminum-containing mixed-metal oxides using doped carboxylate alumoxane nanoparticles," Rice University, Houston, Texas, 2000, pp. 1777-1789, vol. 83, No. 7, Journal of the American Ceramic Society.

Callender, Rhonda L., et al., "Formation and evaluation of highly uniform aluminate interface coatings for sapphire fiber reinforced ceramic matrix composites (FRCMCs) using carboxylate-alumoxane nanoparticles," Journal of Materials Science, 2001, pp. 4977-4987, vol. 36, Kluwer Academic Publishers.

Callender, Rhonda L., et al., "Novel route to alumina and aluminate interlayer coatings for SiC, carbon, and Kevlar® fiber-reinforced ceramic matrix composites using carboxylate-alumoxane nanoparticles," J. Mater. Res., Oct. 2000, pp. 2228-2237, vol. 15, No. 10, Materials Research Society.

Defriend, Kimberly A., et al., "A simple approach to hierarchical ceramic ultrafiltration membranes," Journal of Membrane Science, 2003, pp. 29-38, vol. 212, Elsevier Science B.V.

Defriend, Kimberly A., et al., "Surface repair of porous and damaged alumina bodies using carboxylate-alumoxane nanoparticles," Journal of Materials Science, 2002, pp. 2909-2916, vol. 37, Kluwer Academic Publishers.

Foreign communication from a related counterpart application—International Search Report and Written Opinion, PCT/US04/03615, Sep. 19, 2006, 6 pages.

Gregg, S. J., et al., "Adsorption, surface area and porosity," Second Edition,1982, 3 pages, Academic Press, A Subsidiary of Harcourt Brace Jovanovich, Publishers, London.

Jones, Christopher D., et al., "Alumina ultrafiltration membranes derived from carboxylate-alumoxane nanoparticles," Journal of Membrane Science, 2001, pp. 175-184, vol. 193, Elsevier Science B.V.

Kareiva, Aivaras, et al., "Carboxylate-substituted alumoxanes as processable precursors to transition metal-aluminum and lanthanide-aluminum mixed-metal oxides: atomic scale mixing via a new transmetalation reaction," Chem. Mater., 1996, pp. 2331-2340, vol. 8, No. 9, American Chemical Society.

Kawasaki, Takayoshi, et al., "Hierarchical self-assembly of chiral complementary hydrogen-bond networks in water: reconstitution of supramolecular membranes," J. Am. Chem. Soc., 2001, pp. 6792-6800, vol. 123, No. 28, American Chemical Society.

Lin, Hong-Ping, et al., "Hierarchical order in hollow spheres of mesoporous silicates," Chem Mater., 1998, pp. 3772-3776, vol. 10, No. 12, American Chemical Society.

Zhong, Z. Y., et al., "Sonochemical synthesis and characterization of iron oxide coated on submicrospherical alumina: a direct observation of interaction between iron oxide and alumina." J. Phys. Chem. B, 1999, pp. 947-956, vol. 103, No. 6, American Chemical Society.

* cited by examiner

| Sequence | Surface Area (m$^2$.g$^{-1}$) | Pore Volume (mL.g$^{-1}$) |
| --- | --- | --- |
| untreated PS beads | 1.47 | 0.01 |
| alumoxane coated PS beads | 182 | 0.22 |
| A-alumoxane[a] after calcining to 220 °C | 216 | 0.26 |
| A-alumoxane calcined to 220 °C[a] after washing with toluene | 146 | 0.25 |
| after sintering to 1000 °C | 142 | 0.55 |
| A-alumoxane fired 1000 °C[a] | 111 | 0.32 |

[a] Free-standing samples formed by evaporation of an aqueous solution of A-alumoxane onto a flat substrate. Used for comparative purposes.

Fig. 7

|  | Alumina support | "Flat" alumina membrane | Membrane containing pre-formed α-alumina spheres | | |
| --- | --- | --- | --- | --- | --- |
| wt% A-alumoxane used for spheres | n/a | n/a | 2 | 5 | 8 |
| Flow (mL.min$^{-1}$) | 0.12 | 0.71 | 0.108 | 0.065 | 0.06 |
| Flux ($10^{-6}$ m.s$^{-1}$) | 1.44 | 0.86 | 1.3 | 0.78 | 0.73 |
| Permeability (nm$^2$) | 37.0 | 22.1 | 33.7 | 20.4 | 18.7 |
| Pore volume (mL.g$^{-1}$) |  | 0.32 | 0.47 | 0.48 | 0.50 |
| Surface area (m$^2$.g$^{-1}$) | 3.5 | 111.0 | 245.5 | 224.8 | 254.24 |

Fig. 13

| Alumoxane | polystyrene (μm) | flow (mL/min) | flux ($10^{-6}$ m/s) | permeability ($nm^2$) | surface area ($m^2/g$) | pore volume (mL/g) |
| --- | --- | --- | --- | --- | --- | --- |
| Support | - | 0.116 | 1.40 | 37.18 | 3.5 | 0.02 |
| A-alumoxane | - | 0.071 | 0.85 | 22.15 | 111.3 | 0.32 |
| A-alumoxane | 0.75 | 0.103 | 1.25 | 32.21 | 267.0 | 0.50 |
| A-alumoxane | 3.0 | 0.106 | 1.28 | 32.98 | 265.1 | 0.56 |
| A-alumoxane | 15 | 0.095 | 1.15 | 29.68 | 272.1 | 0.57 |
| A-alumoxane | mixed | 0.072 | 0.87 | 22.48 | 285.6 | 0.42 |
| MEEA-alumoxane | 0.75 | 0.102 | 1.23 | 31.77 | 218.52 | 0.53 |
| MEEA-alumoxane | 3.0 | 0.159 | 1.92 | 49.57 | 231.75 | 0.56 |
| MEEA-alumoxane | 15 | 0.159 | 1.92 | 49.66 | 333.50 | 0.81 |
| MEEA-alumoxane | mixed | 0.121 | 1.46 | 37.71 | 202.14 | 0.29 |

Fig. 20

HIGH STRENGTH POLYCRYSTALLINE CERAMIC SPHERES

CROSS-REFERENCE TO RELATED APPLICATIONS

This is a Divisional Application of U.S. patent application Ser. No. 10/774,319, filed Feb. 6, 2004 and entitled "High Strength Polycrystalline Ceramic Spheres," which claims the benefit of U.S. Provisional Application Ser. No. 60/445,551, entitled "High Strength Polycrystalline Ceramic Spheres," and U.S. Provisional Application Ser. No. 60/445,586, entitled "Method of Making Hierarchical Ceramic Ultrafiltration Membranes," both filed Feb. 6, 2003. All of which applications are hereby incorporated by reference herein in their entirety.

SPONSORED RESEARCH OR DEVELOPMENT

Research leading to the present invention was supported in part by the federal government under Grant No. DMI-9613068 awarded by the National Science Foundation. The United States government may have certain rights in the invention.

BACKGROUND OF THE INVENTION

Recognition that the macroscopic properties of materials depend not only on their chemical composition, but also on the size, shape and structure, has spawned investigations into the control of these parameters for various materials. In this regard, the fabrication of uniform hollow spheres has recently gained much interest. Hollow capsules with nanometer and micrometer dimensions offer a diverse range of potential applications, including: utilization as encapsulants for the controlled release of a variety of substances, such as drugs, dyes, proteins, and cosmetics. When used as fillers for coatings, composites, insulating materials or pigments, hollow spheres provide advantages over the traditional solid particles because of their associated low densities. Hollow spheres may also be used in applications as diverse as hierarchical filtration membranes and proppants to prop open fractures in subterranean formations. A spherical morphology also allows for applications in optical devices.

The geometry of the spheres has been shown to increase the strength of composite materials. Incorporating hollow spheres into composite materials improves the strength and the fracture strength of the material. Typically, materials (organic or inorganic) are reinforced with fibers that retard the propagation of stress cracks. When hollow particles are incorporated into the fiber-reinforced composite, the crack growth is further stopped by the neighboring particles, for example, incorporation of glass beads into an epoxy resin.

Hollow particles have been fabricated from a variety of materials, such as polymers, metal, ceramics, and glass, however, a great deal of research has focused on various metal oxides, due to their chemical, thermal, and oxidative resistance, and because they have low dielectric constants and are optically transparent. Conventional methods to produce hollow ceramic spheres are vapor deposition, sputtering, molecular beam deposition and electrolytic deposition; however, these processes do not always provide a uniform coating of individual particles. Ceramic spheres exhibiting a uniform coating and thickness have been achieved with the sol-gel route. Typically the spheres are formed by templating with either polystyrene spheres or silica spheres. The polystyrene or silica spheres are coated with the sol-gel, after which the core is etched away, and calcination results in a ceramic hollow sphere. Titanium dioxide, barium titanate, alumina, and aluminosilicate spheres have been fabricated using the sol-gel templating technique.

It has previously been shown that for alumina films and bodies, a low cost, flexible, alternative to sol-gels are chemically functionalized alumina nanoparticles (carboxylate-alumoxanes) (R. L. Callender, C. J. Harlan, N. M. Shapiro, C. D. Jones, D. L. Callahan, M. R. Wiesner, R. Cook, and A. R. Barron, Chem. Mater. 9 (1997) 2418, incorporated herein by reference). These alumina nanoparticles may be prepared, in the size range 10-100 nm with a narrow size distribution, by the reaction of the mineral boehmite with a wide range of carboxylic acids. Besides the use of aqueous reaction conditions, without mineral acids or other additives (resulting in high ceramic yields and low shrinkage), the carboxylate-alumoxanes are stable in solution or the solid state (i.e., they do not precipitate or undergo changes in particle size ordinarily associated with aging of sol-gels). Carboxylate-alumoxanes may be used as ceramic precursors for the coating on carbon, SiC and Kevlar fibers (as demonstrated in R. L. Callender and A. R. Barron, J. Mater. Res. 15 (2000) 2228, herein incorporated by reference).

A further advantage of the carboxylate-alumoxane nanoparticle approach is that the porosity of the ceramic formed upon thermolysis may be controlled by the substituent of the carboxylic acid, which has led to their application as precursors for ceramic membranes. A final advantage of the alumoxane approach over traditional sol-gel is the ease by which aluminate phases may be prepared, often at a lower temperature than previously observed. Thus, carboxylate-alumoxanes may be used to create hollow spheres of alumina or an aluminate. Furthermore, it has previously been shown that layer-by-layer (LbL) growth of laminates is possible, which opens-up the possible fabrication of ceramic composites with increased applications, such as the formation of magnetic materials (Z. Y. Zhong, T. Prozorov, I. Felner, and A. Gedanken, J. Phys. Chem. 103 (1999) 947, herein incorporated by reference).

Alumina sol-gel-derived membranes are presently the most accepted routes to making alumina ultrafiltration filters. Lennears, Keizer, and Burgraff first developed the technique of using sol-gel processes to make alumina ultrafiltration membranes. These filters, along with the vast majority of those reported in the literature, were made by the controlled hydrolysis of aluminum alkoxides to form alumina. The preparation techniques used by various researchers vary the drying or sintering conditions, which result in small changes in porosity or pore size. The membrane selectivity is primarily dependent upon the pore-size distribution; the narrower the pore size distribution, the more selective the membrane. However, for membranes produced by sol-gel techniques the pore size is generally limited to the size distribution of the precursor particles before sintering, which is difficult to control. Furthermore, sol-gels must be used immediately after preparation to avoid aggregation or precipitation.

It has previously been reported that the fabrication of asymmetric alumina ultrafiltration membranes may be accomplished using carboxylic acid surface stabilized alumina nanoparticles (carboxylate-alumoxanes) (D. A. Bailey, C. D. Jones, A. R. Barron, and M. R. Wiesner, "Characterization of alumoxane-derived ceramic membranes", J. Membrane Sci., 176, (2000), 1-9 and C. D. Jones, M. Fidalgo, M. R. Wiesner, and A. R. Barron, "Alumina ultrafiltration membranes derived from carboxylate-alumoxane nanoparticles", J. Membrane Sci., 193, (2001), 175-184, herein incorporated by reference). A comparison with membranes derived from sol-gel methods showed carboxylatealumoxane-based membrane properties to be favorable. The synthesis of the alumina nanoparticles is simple and low cost, producing a defect free membrane in a one-step process. For example, the carboxylate-alumoxane nanoparticles may be prepared in sufficient quantity for 100-200 m² of finished membrane in a single laboratory-scale batch, with the cost of raw material being less that $5. Once prepared, the carboxylate-alumoxanes are stable for months in solution, or may be dried and redissolved as desired, without changes in particle size.

For both sol-gel and the present carboxylate-alumoxane derived membranes, mechanical integrity and permeability may be enhanced by supporting a relatively thin selective membrane on a thicker, more permeable substrate so as to produce an asymmetric membrane. Despite this approach, and due to the small pore size of the alumoxane-derived membranes, the permeability of the asymmetric membranes is significantly lower than that of the support. In order to approach the permeability of the support, the ultrafiltration membrane must be as thin as possible. Sol-gel derived membranes often require multiple dip-fire sequences to ensure integrity. In contrast, a single step process is sufficient for the alumoxane nanoparticle approach. Unfortunately, in order to ensure a defect free membrane, a thickness of 1-2 μm is required. Thus, an alternative approach must be used in both processes in order to increase flow.

A typical technique for constructing a sol-gel membrane is to layer materials of different porosity such that the thinnest possible layer of the "effective" ultrafiltration membrane is provided. However, this also required multiple process steps and each layer may result in a decrease in flux. If decreasing membrane thickness is not practical, an alternative approach is to increase the macroscopic surface area of the membrane. By analogy with biological membranes, one proposal is the creation of a hierarchical structure, in which the macroscopic structure evolves through ever decreasing sizes. A good example of such a structure would be the mammalian lung. A hierarchical approach has previously been used for organic membranes and mesoporous materials (see T. Kawasaki, M. Tokuhiro, N. Kimizuka, T. Kunitake, "Hierarchical self-assembly of chiral complementary hydrogen-bond networks in water", *J. Am. Chem. Soc.*, 123 (2001) 6792-6800 and H.-P. Lin, Y.-R. Cheng, C.-Y. Mou, "Hierarchical order in hollow spheres of mesoporous silicates", *Chem. Mater.* 10 (1998) 3772-377, incorporated herein by reference).

SUMMARY OF THE PREFERRED EMBODIMENTS

Embodiments of the present invention comprise polycrystalline alumina and aluminate hollow spheres with a hardness approaching crystalline sapphire as well as applications utilizing such spheres. One such application is the use of hollow spheres in filtration membranes. The application of ceramic membranes in pollution prevention, resource recovery and waste treatment activities is increasing due to their excellent mechanical strength and tolerance to solvents, as well as to extremes of pH, oxidation, and temperature. In addition, the amphoteric properties of ceramic surfaces result in uniquely versatile membranes for water and waste-water treatment.

Embodiments of the present invention also comprise methods for fabrication of hollow alumina and aluminate spheres. The steps in such methods comprise coating a polystyrene bead with an alumoxane solution, drying the bead, and then heating the coated bead to a temperature sufficient to calcine the alumoxane to porous amorphous alumina. The coated bead is then washed in a solvent to remove the polystyrene bead from inside the coating. The remaining shell is then heated to a temperature sufficient to form an α-alumina sphere.

Further embodiments of the present invention include the methods and apparatus to use hollow alumina or aluminate spheres in applications such as proppants, composites, and filtration membranes.

Still further embodiments of the present invention comprise a method for producing a ceramic filtration membrane by suspending polystyrene beads in an aqueous alumoxane solution. In these embodiments, an α-alumina support is then coated in the polystyrene/alumoxane colloidal solution, dried, and heated to a temperature sufficient to cause the top of the coated spheres to burst

BRIEF DESCRIPTION OF THE DRAWINGS

For a more detailed understanding of the preferred embodiments, reference is made to the accompanying Figures, wherein:

FIG. 7 is a table summarizing the pore volume and surface area for samples at each stage of the synthesis.

FIG. 13 is a table summarizing properties of various components.

FIG. 20 is a table summarizing properties of various membranes.

DETAILED DESCRIPTION OF THE PREFERRED EMBODIMENTS

Figure 1:
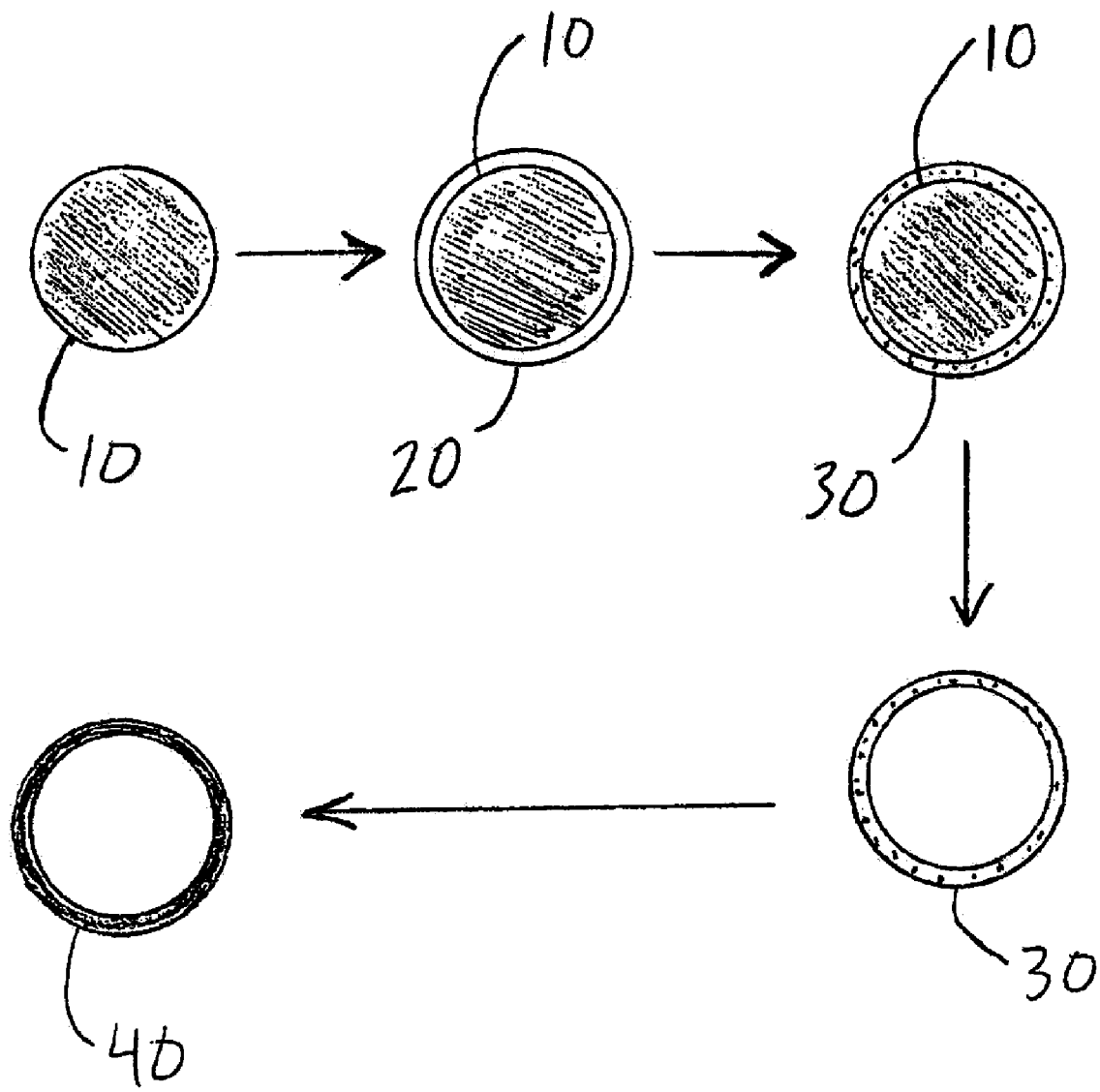
FIG. 1 is a schematic diagram of the process for forming hollow alumina spheres.

A schematic representation of the process for forming hollow alumina spheres is shown in FIG. 1. In general, a plurality of beads 10 are coated with an alumoxane coating 20, which is then fired so that it becomes a porous amorphous alumina layer 30. The beads are dissolved and removed, leaving a hollow shell of porous amorphous alumina, which is then fired so that it becomes a hard ceramic shell 40. These steps are illustrated in greater detail in the Examples below.

EXAMPLES

Hollow Spheres

Figure 2:
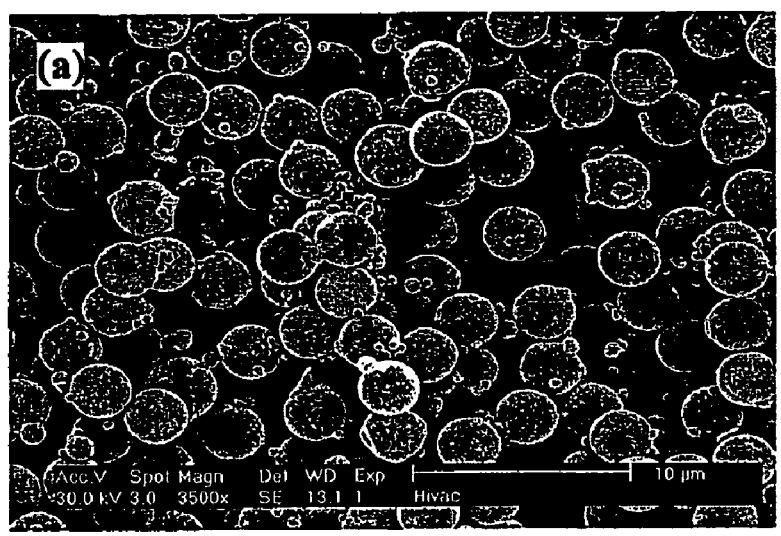
FIG. 2 is a scanning electron microscope (SEM) image of dry-form polystyrene beads.

An acetate-alumoxane (A-alumoxane) (not shown) was prepared according to the method described in *Chem. Mater.* 9 (1997) 2418 by R. L. Callender, C. J. Harlan, N. M. Shapiro, C. D. Jones, D. L. Callahan, M. R. Wiesner, R. Cook, and A. R. Barron, which is incorporated herein by reference. Aqueous solutions of alumoxane were then degassed before use. Dry-form polystyrene beads 10, such as those available from Polysciences, Inc. and shown in FIG. 2, were preferably used. Beads of polymers other than polystyrene may be used, so long as the polymer is soluble in a solvent. Likewise, beads of other materials may be used, so long as they are soluble in a solvent that will not damage the alumoxane coating.

Figure 3:
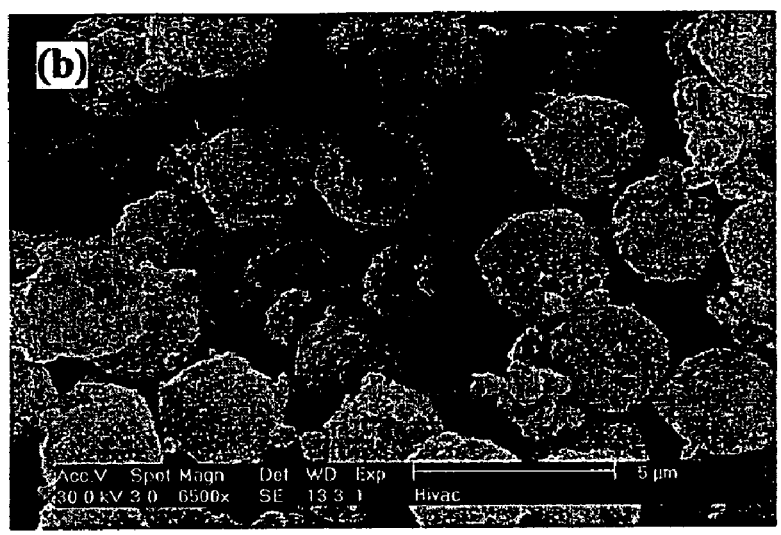
FIG. 3 is an SEM image of coated beads.

Beads 10 were then coated with the aqueous solution of A-alumoxane, as shown in the SEM image in FIG. 3. The aqueous solution of A-alumoxane may range from 1-10 weight percent. The aqueous solution of A-alumoxane more preferably ranges from 2-8 weight percent, and most preferably is 8 weight percent. Beads 10 may range from 1-80 μm in diameter, and are preferably 1-5 μm in diameter and more preferably about 3 μm in diameter.

The solution was pipetted onto beads 10 that were placed in a coated ceramic firing crucible (not shown), and allowed to dry in air. The coating process was conducted in a ceramic firing crucible to minimize the amount of agitation of beads 10. Beads 10 were covered or coated three times to achieve a uniform alumoxane coating 20. The number of coatings is important in obtaining a structurally sound alumina sphere. It was found that three coating/drying cycles were preferred to provide an alumoxane shell with good shape retention and uniformity. If a single coating/drying cycle was used, the spheres collapsed upon firing to 1000° C.

Figure 4:
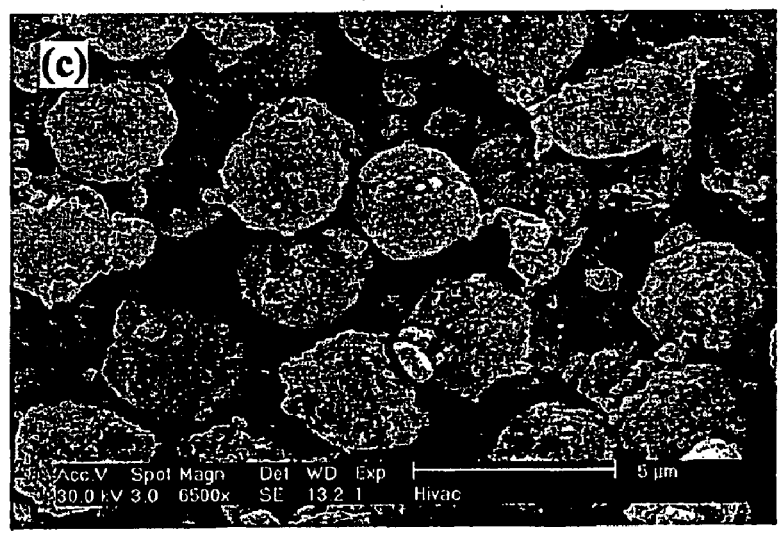
FIG. 4 is an SEM image of coated beads.
Figure 5:
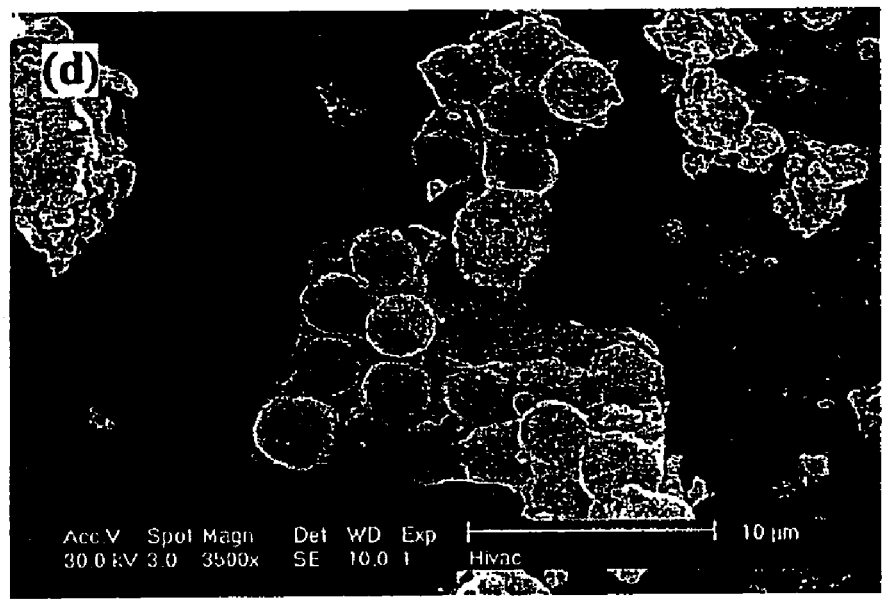
FIG. 5 is an SEM image of beads after washing with solvent.
Figure 6:
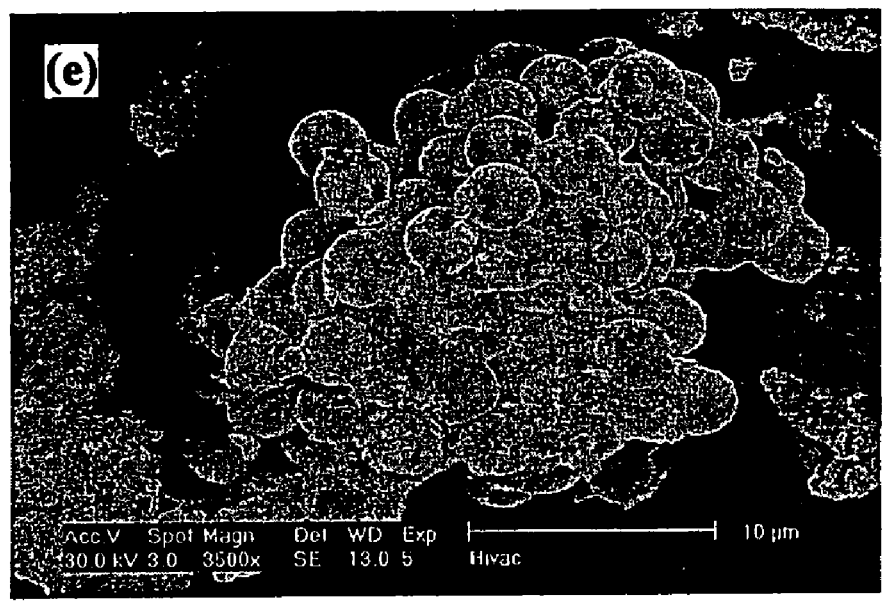
FIG. 6 is an SEM image of beads after heating to 1000° C.

Alumoxane-coated polystyrene beads 10 were fired to 220° C. for 40 minutes to burn off organic substituents (not shown). The firing converted the alumoxane coating 20 to a porous amorphous alumina coating 30, as shown in the SEM image in FIG. 4. This allows a solvent such as toluene (not shown) to dissolve polystyrene beads 10 but not amorphous alumina coating 30. Beads 10 with amorphous alumina coating 30 were stirred in toluene for 1 hour and then vacuum filtered, with the results shown in the SEM image in FIG. 5. The washing process was performed 5 times before firing to 1000° C. to convert amorphous alumina coating 30 to hard ceramic α-alumina shell or sphere 40. Hard ceramic α-alumina spheres 40 resulting from the firing to 1000° C. are shown in the SEM image in FIG. 6. Multiple washes were conducted to remove all of the polystyrene resulting from the dissolution of polystyrene beads 10, because the polystyrene solution tends to "gum up" the surface of α-alumina sphere 40, precluding removal of additional polystyrene. To separate free-standing α-alumina spheres 40 from any extra alumina resulting from the coating process, the fired (1000° C.) material was placed in water, centrifuged and filtered.

The calcination temperature of 220° C. was chosen to fit within the boundaries of the decomposition of the alumoxanes to alumina (greater than 180° C.) and the decomposition temperature for polystyrene (230° C.). Both values were obtained from thermogravimetric analysis (TGA) measurements. Firing to a sufficiently high temperature to form (amorphous) alumina is important because coating 30 must be sufficiently strong to be able to withstand the toluene washing cycle. In addition, the un-fired alumoxanes are soluble in toluene so they must be rendered insoluble before the washing stage. Conversely, if the polystyrene bead 10 is allowed to pyrolize, the gases evolved burst amorphous alumina coating 30, causing destruction to the shell. The complete removal of the polystyrene after the washing cycle is confirmed by TGA measurements showing an absence of the decomposition curve due to polystyrene.

FIG. 7 provides a summary of the pore volume and surface area for the samples at each stage of the synthesis. The surface area of the polystyrene beads is very low, signifying a relatively pore-free material. Once coated with A-alumoxane the surface area is dominated by the alumoxane coating as indicated by a comparison with a free standing sample of the same alumoxane. Firing the coated beads to 220° C. does not significantly alter the pore volume and presumably allows for the removal of the polystyrene by the toluene wash. As expected, the surface area decreases on sintering, although the total pore volume does not decrease. This suggests that the final α-alumina spheres are highly porous materials. The highly porous nature of the spheres may be utilized in various applications, such as ultrafiltration membranes, discussed below.

Figure 8:
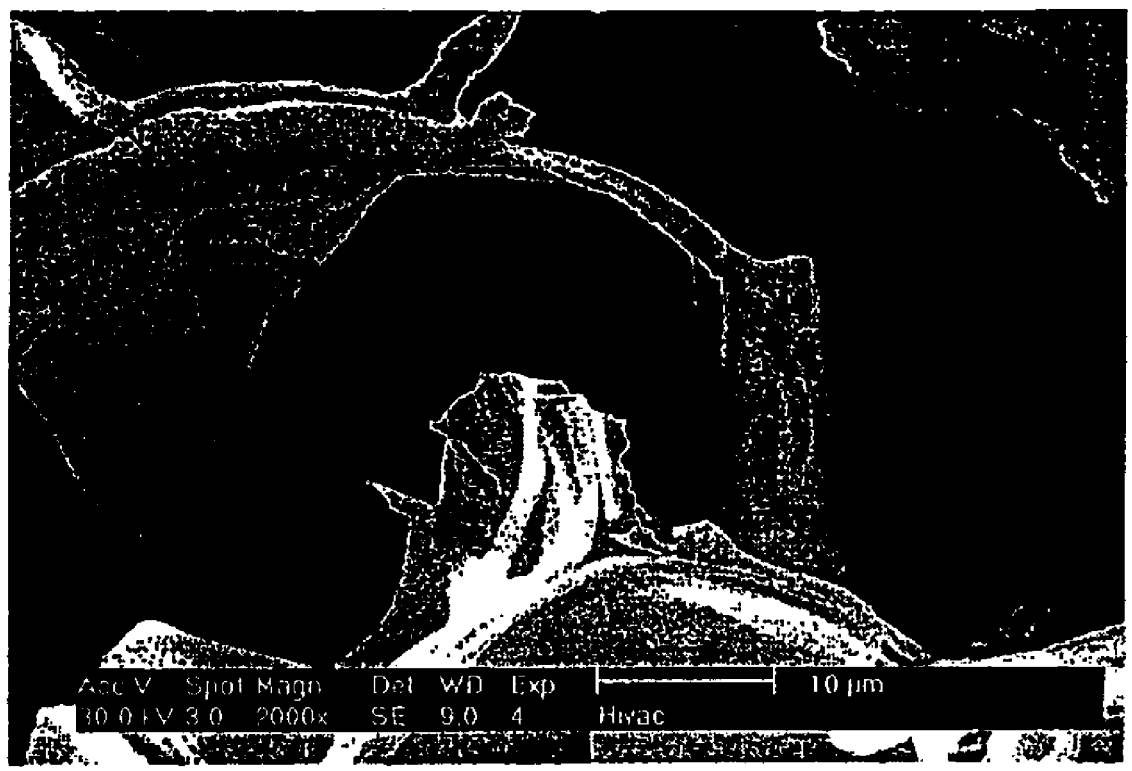
FIG. 8 is an SEM image of a wall of an alumina sphere.

A further indication of the surface porosity of the alumina spheres may be seen from SEM images. The surface of the untreated polystyrene spheres shows a smooth morphology; in contrast, the surface of the alumina spheres formed at 1000° C. is granular corresponding to the formation of alumina. The sizes of the alumina grains present (approximately 25 nm) are consistent with the size of alumina grains formed from firing of A-alumoxane films. The thickness of the hollow alumina spheres synthesized from a 2 wt % A-alumoxane is approximately 1 μm, as shown in FIG. 8. Thicker walls are formed with increasing alumoxane concentrations.

Figure 9:
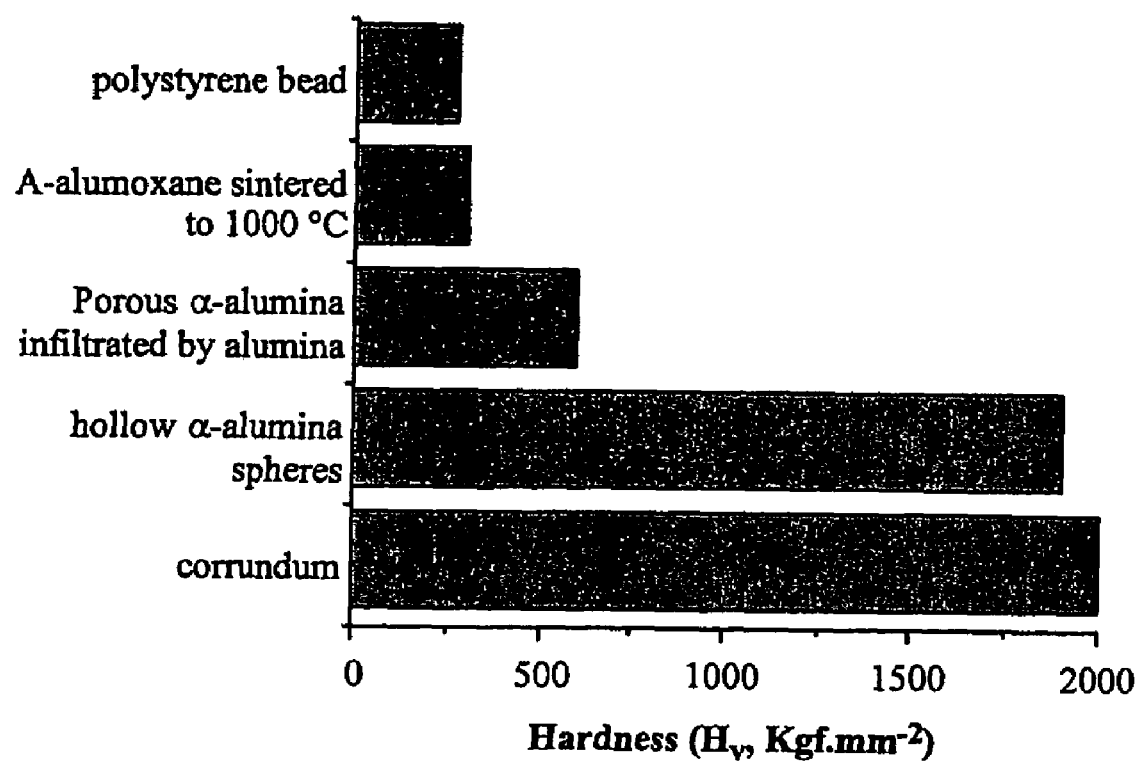
FIG. 9 is chart comparing the hardness of various components.

The results of hardness testing performed on the α-alumina spheres using Vicker's indention testing are shown in FIG. 9. The hardness of the hollow alumina spheres (1900±100) approached the hardness of corundum (ca. 2000) and was significantly harder than a planar piece of A-alumoxane sintered under the same conditions. This latter observation confirms the benefit of the spherical structure with regard to using shape and structure to obtain a higher structural strength than is inherent in a specific material.

Hollow Mixed Metal Oxide Spheres

Figure 10:
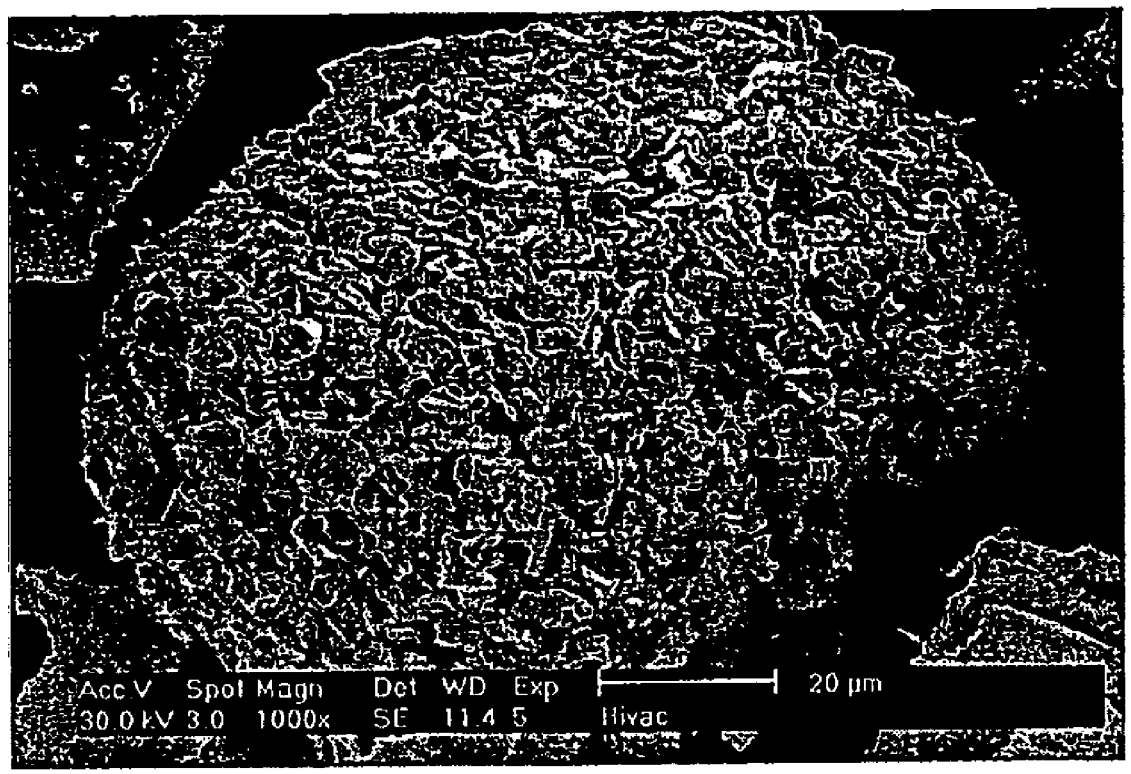
FIG. 10 is an SEM image of a sphere exhibiting plate like crystals.

Hollow mixed metal oxide spheres may also be synthesized using the hollow α-alumina spheres 40 as a template. The hollow α-alumina spheres 40 are covered or coated with a solution of a metal-doped alumoxane (not shown). A method of creating metal-doped materials is described in U.S. Pat. No. 6,207,130, entitled "Metal-exchanged carboxylato-alumoxanes and process of making metal-doped alumina", and herein incorporated by reference. After calcining to 1000° C., the mixed metal oxide phase forms outside of α-alumina sphere 40, resulting in a composite like ceramic bi-layer sphere. Suitable mixed metal oxides were prepared using Ca-, Er-, Mg-, Ti, and Y-doped MEEA-alumoxane to form $CaAl_{12}O_{19}$, $Er_6Al_{10}O_{24}$, $MgAl_2O_4$, $Al_2TiO_5$, and $Y_3Al_5O_{12}$, respectively. The formation of each phase was confirmed by x-ray diffraction measurements. The morphology of the surface of the sphere is the same as the appropriate metal oxide. For example, the $\alpha\text{-}Al_2O_3/CaAl_{11}O_{18}$ sphere exhibits plate-like crystals, as shown in the SEM image in FIG. 10, confirming the formation of hibonite. It has been previously shown in the prior art that $CaAl_{12}O_{19}$, $Er_6Al_{10}O_{24}$, and $MgAl_2O_4$ are effective interphase coatings for fiber reinforced ceramic matrix composites (FRCMCs) (see R. L. Callender and A. R. Barron, *Adv. Mater.* 12 (2000) 734, herein incorporated by reference).

The hollow α-alumina and mixed metal spheres have many potential applications, including use in proppants, composites, and filtration membranes. The hardness and porosity of the hollow α-alumina spheres allow them to be used in the manufacture of proppants. The extreme hardness of the spheres makes them well suited for propping open fractures in subterranean formations. The high porosity of the spheres allows the fluid in the formation to easily flow through the sphere without significant restriction.

Hollow α-alumina spheres can also be used in the formation of ceramic matrix composites. Fiber reinforced ceramic matrix composites (FRCMCs) are commonly employed where the performance of the ceramic matrix alone is insufficient. In fiber-reinforced ceramics, the reinforcement is primarily utilized to enhance the fracture toughness. The fiber reinforcement prevents catastrophic brittle failure by providing mechanisms that dissipate energy during the fracture process. The operation of various toughening mechanisms, such as crack deflection, fiber pull out, and fiber bridging, to a large extent depend on the degree of chemical and/or mechanical bonding at the fiber-matrix interface. Although spheres would not simulate pull out, they would provide crack deflection. The added issue with spheres described herein, is that their density is significantly lower than the bulk ceramic, since approximately 90% of their volume is air. Thus, the overall density of a composite is decreased with respect to increased loading. Furthermore, the bulk dielectric constant of any body containing spheres will be reduced with increased loading.

The inclusion of a ceramic reinforcement relies on the degree of chemical and/or mechanical bonding at the reinforcement-matrix interface. It is necessary to control the interfacial bond in order to optimize the overall mechanical behavior of the composite. In this regard, it has previously been shown that aluminate coatings on fibers provide superior performance characteristics as compared to the native fiber (see R. L. Callender and A. R. Barron, *J. Mater. Res.* 15 (2000) 2228 and R. L. Callender and A. R. Barron, *J. Mater. Sci.* 36 (2001) 4977, herein incorporated by reference). It has also been shown that not only alumina spheres may be formed but also that multilayer spheres can be prepared that mimic the interfacial layer often applied as a coating on fibers to prevent deleterious chemical reactivity and provide a mechanism that promotes graceful failure at the fiber-matrix interface.

Ceramic Films

Hollow α-alumina spheres, produced by the method described above, were incorporated into a ceramic thin film formed from a 1 wt % A-alumoxane aqueous solution. Since the 2, 5, and 8 wt % A-alumoxane solutions produced hollow alumina spheres with good shape retention, hollow α-alumina spheres using these concentrations were incorporated into the thin films. A flat ceramic thin film (of approximately 1 μm thickness prepared using A-alumoxane) on a porous alumina support was used as a base for the composite structure. The surface of a flat ceramic substrate was brought into contact with a suspension of α-alumina spheres in an aqueous solution of A-alumoxane solution for 2-5 seconds. The newly made thin film was dried in air overnight before firing to 600° C. for 6 hours with a dwell time of 5 hours. SEM images (not shown) of the surface and cross section show the incorporation of the hollow spheres into an alumina matrix. The hardness of the sphere-reinforced ceramic matrix composites (SRCMC) as compared to the matrix material (in the absence of the ceramic spheres) shows an improvement from 220 to 370 and 650 Kg.mm$^{-2}$ after heating the composite to 600 and 1000° C., respectively.

Composite Materials

In addition, hollow α-alumina spheres produced by the method described above may also be used in the formation of polymer matrix composites. Hollow α-alumina spheres were suspended in an 1:1 (wt) mixture of resin (Resin Services 302) and hardener (Resin Services 874) in an aluminum pan. A 2 wt % of the spheres to resin/hardener was used. The resin/hardener mixture containing the spheres was cured at 50° C. for 24 h. Similar composites with spheres of a nominal diameter between 50 and 80 μm may be prepared in the same manner. Incorporation of the hollow α-alumina spheres into the epoxy resin results in an increase of the hardness from 170 to 570 kg/mm$^2$. SEM images of a cross section show the spheres are reasonably dispersed, however, further improvement in compatibility may be obtained by surface functionalization of the α-alumina spheres.

Ultrafiltration Membranes

Figure 11:
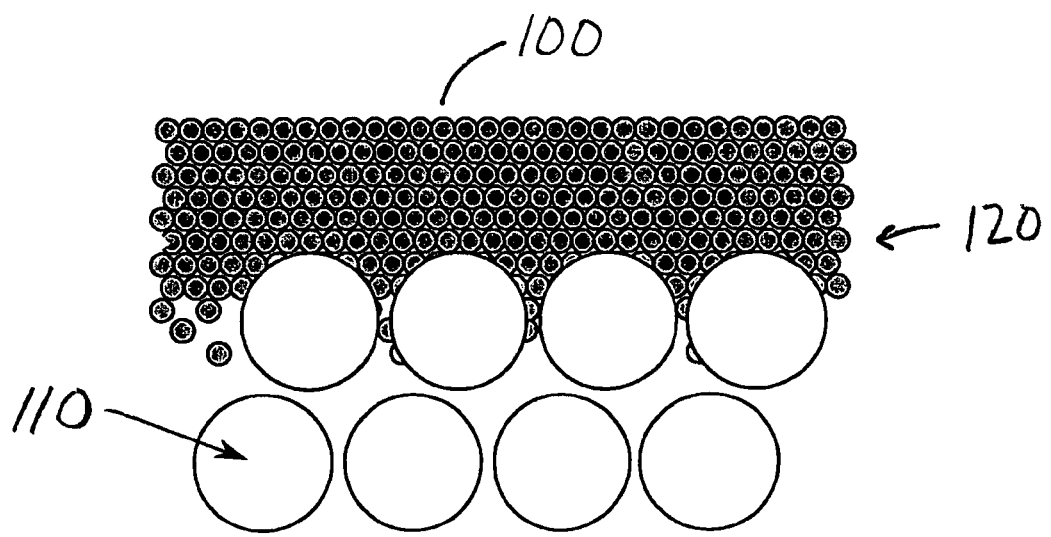
FIG. 11 is a schematic representation of an asymmetric filtration membrane.

Hollow α-alumina spheres produced by the method described above may also be utilized in the fabrication of asymmetric alumina ultrafiltration membranes with a hierarchical structure. As shown in FIG. 11, an asymmetric membrane 120 is comprised of relatively thin selective membrane 100 supported by thicker, more permeable substrate 110. This results in asymmetric membrane 120 with enhanced mechanical integrity and permeability.

Before hollow α-alumina spheres may be incorporated into the asymmetric membrane, acetic acid and methoxy(ethoxyethoxy)acetic acid functionalized alumina nanoparticles (A-alumoxane and MEEA-alumoxane, respectively) were prepared by methods previously described (see also R. L. Callender and A. R. Barron, "Facile synthesis of aluminum containing mixed metal oxides using doped carboxylate-alumoxane nanoparticles", *J. Am. Ceram. Soc.*, 83 (2000) 1777 and A. Kareiva, C. J. Harlan, D. B. MacQueen, R. Cook, and A. R. Barron, "Carboxylate substituted alumoxanes as processable precursors to transition metal-aluminum and lanthanide-aluminum mixed metal oxides: atomic scale mixing via a new transmetalation reaction", *Chem. Mater.*, 8 (1996) 2331, herein incorporated by reference). Aqueous solutions of alumoxane were then degassed before use. Refractron™ α-alumina supports were obtained from the Refractron Technologies Corp. (Newark, N.J.) and were heated to 600° C. prior to use to remove surface grease. Colloidal polystyrene beads of 0.75, 3, or 15 μm diameter and 3 μm spheres in the dry form, were obtained from Polysciences, Inc.

Hollow α-alumina spheres (3 μm nominal diameter) prepared as described above were suspended in an aqueous solution of either A-alumoxane (1 wt %) or MEEA-alumoxane (10 wt %), prepared as described above. The pre-formed hollow α-alumina spheres were incorporated into a ceramic membrane formed from a 1 wt % A-alumoxane aqueous solution. Since the 2, 5, and 8 wt % A-alumoxane solutions produced hollow alumina spheres with good shape retention, spheres using these concentrations were incorporated into the membranes. The surface of a flat ceramic membrane was brought into contact with a suspension of alumina spheres in an aqueous solution of A-alumoxane solution for 2-5 seconds. The newly made filter was dried in air overnight before firing to 600° C. for 6 hours with a dwell time of 5 hours. The total thickness of the membrane was designed to be comparable to the flat 2 μm thick membranes previously described in C. D. Jones, M. Fidalgo, M. R. Wiesner, and A. R. Barron, "Alumina ultrafiltration membranes derived from carboxylate-alumoxane nanoparticles", *J. Membrane Sci.*, 193, (2001), 175-184, herein incorporated by reference.

Figure 12:
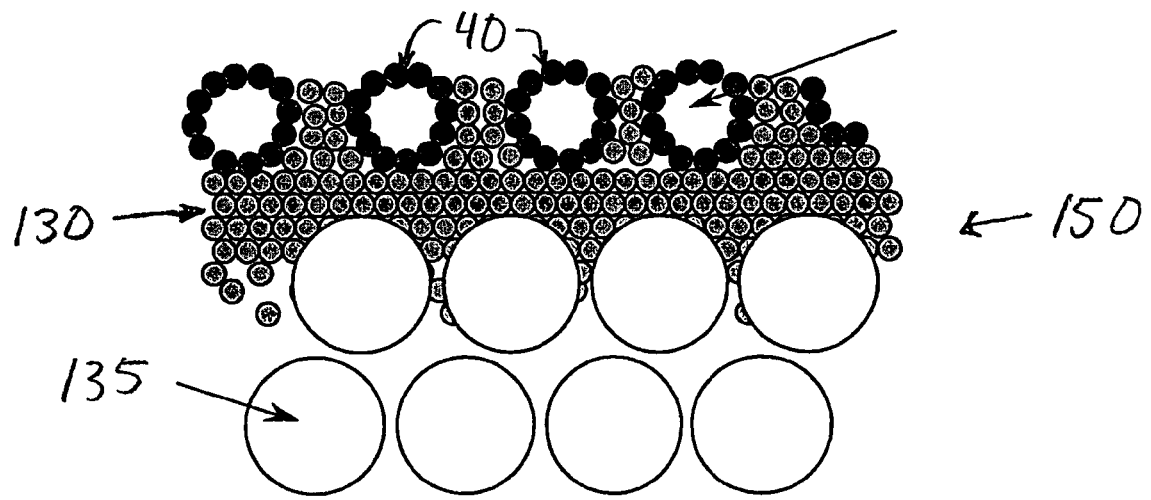
FIG. 12 is a schematic representation of a hierarchical filtration membrane.

FIG. 12 is a schematic representation of asymmetric membrane 150. Flat ceramic membrane 130, of approximately 1 µm thickness, prepared using A-alumoxane on porous Refractron α-alumina support 135, was used as a base for macroporous membrane 140 containing hollow α-alumina spheres 40. Base membrane 130 was used so as to ensure that any macroscopic holes or cracks (not shown) in macroporous membrane 140 would not lead to failure of asymmetric membrane 150. FIG. 13 provides a summary of flow, flux, and permeability characteristics for α-alumina support 135, flat 2 µm thick alumina membranes described above, and asymmetric membranes 150.

As shown in FIG. 13, the flux and permeability parameters for the membrane with the alumina spheres derived from 5 and 8 wt % solution of A-alumoxane show values comparable to the flat membrane In contrast, the flux and permeability for the membrane containing alumina spheres derived from 2 wt % solution of A-alumoxane is comparable to the porous support. The concentration of the alumoxane solution determines the wall thickness of the hollow alumina spheres. The flux and permeability measurements suggest that the thicker the wall of the pre-formed alumina sphere the more restricted the flow through the spheres and/or the flow between the spheres, reducing the overall available cross section of the membrane surface. As may be seen from FIG. 13, there is an inverse correlation between the permeability and the size of the spheres. Clearly, the presence of the spheres as part of a membrane system offers a route to improved membrane performance.

An alternative route to increasing the flux and permeability of asymmetric membranes was developed whereby polystyrene (or other polymer soluble in a solvent) beads of either 0.75, 3, or 15 µm diameter from Polysciences, Inc., were suspended in an aqueous solution of either A-alumoxane (1 wt %) or methoxy(ethoxyethoxy)acetic acid alumoxane (MEEA-alumoxane, 10 wt %), prepared as described above. The surface of a Refractron™ α-alumina support was dip coated in the polystyrene/alumoxane colloidal solution. The newly formed filter was allowed to dry overnight before firing to 600° C. for 6 hours with a dwell time of 5 hours, resulting in an asymmetric alumina membrane with a hierarchical tertiary structure. The pyrolysis/sintering temperature was chosen to optimize the pore size and pore size distribution of the resulting alumina membrane. As the polystyrene out-gasses during pyrolysis, the top of the coated spheres burst. This results in a macroporous membrane in which the ceramic walls have a pore size and hence molecular weight cut-off (MWCO) defined by the alumina formed from the alumoxane nanoparticles rather than the macroporous structure of the membrane itself. The permeabilities of these membranes are equivalent or better than the support. One advantage of this method is that the membrane is produced in one step, without having to fabricate the hollow alumina spheres separately. However, one disadvantage is that only one ceramic material may be used in the fabrication of the membrane.

Figure 14:
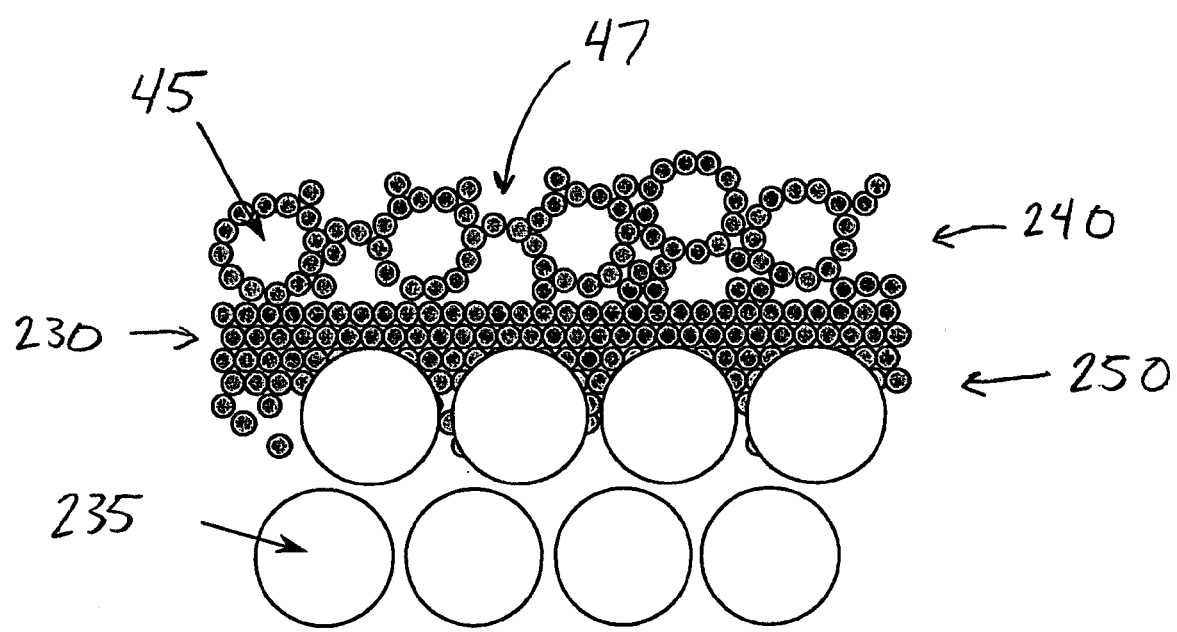
FIG. 14 is a schematic representation of a hierarchical filtration membrane.
Figure 15:
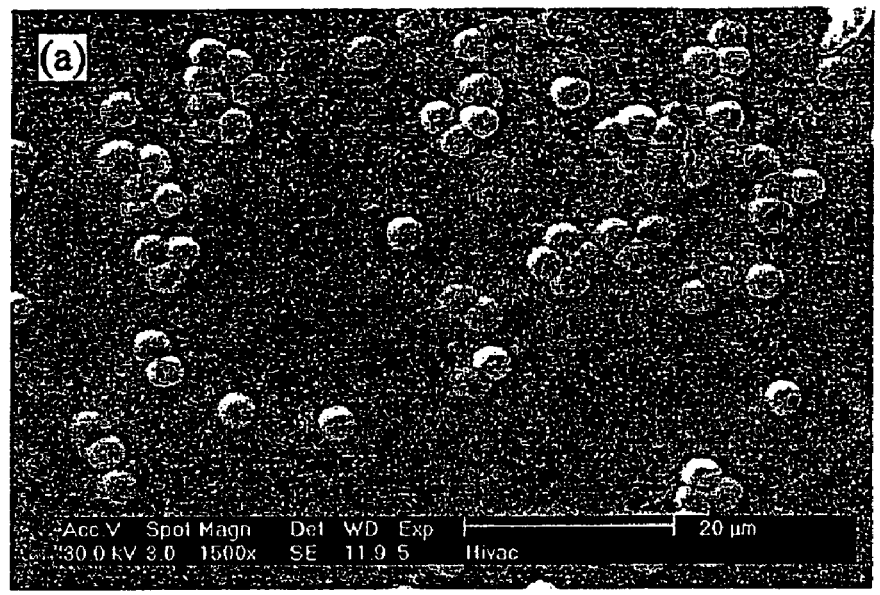
FIG. 15 is an SEM image of an asymmetric membrane.
Figure 16:
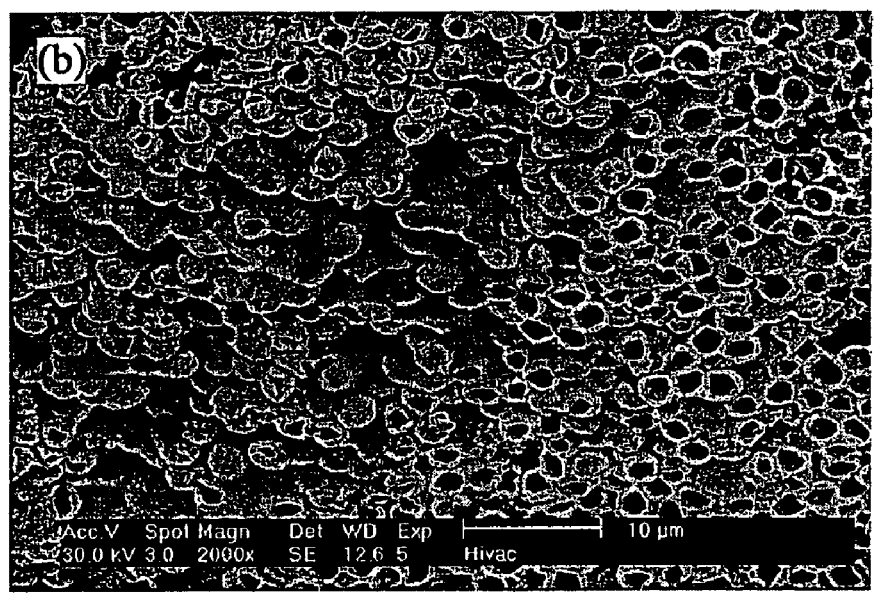
FIG. 16 is an SEM image of an asymmetric membrane.

A schematic representation of resulting asymmetric membrane 250 produced by this method is shown in FIG. 14. Flat ceramic membrane 230, of approximately 1 µm thickness, prepared using A-alumoxane on porous Refractron α-alumina support 235, was used as a base for macroporous membrane 240 containing polystyrene beads (not shown). As described above, the polystyrene out-gasses during pyrolysis leaving hollow voids 45, and some of the coated spheres burst, leaving concave indentions 47 in the surface. Base membrane 230 was used so as to ensure that any macroscopic holes or cracks (not shown) in macroporous membrane 240 would not lead to failure of asymmetric membrane 250. The identity of the alumoxane, the concentration of alumoxane solution, and the diameter of the polystyrene were investigated to determine their effects of the membrane structure and the flow/flux performance of the membrane. Atomic force microscopy (AFM) of the colloids deposited in the alumoxane films shows that there is a difference in spacing between the spheres depending on the identity of the alumoxane solution they are dispersed in. When mixed with MEEA-alumoxane, the spheres appear to be touching, however, A-alumoxane results in the spheres separated by about 4 nm. MEEA-alumoxanes provided a higher ceramic yield and smaller average pore size than A-alumoxanes. The use of higher concentrations of alumoxanes (10 wt %) was found to be detrimental for the optimization of the flux and permeability due to the thickness of the final membrane. Although the 10 wt % concentration of A-alumoxane allowed for the colloidal beads to align on the surface of the membrane support, it prohibits the out gassing of the decomposition products of the polystyrene by insulating the colloids (as shown in the SEM image in FIG. 15). The resulting membranes were similar in appearance to those described above that were formed using the preformed alumina spheres. In contrast, the use of 10 wt % MEEA-alumoxane solutions allowed for alignment of the polymer beads, and resulted in the rupture of the ceramic spheres upon pyrolysis to give a macroporous high surface area membrane, as shown in the SEM image in FIG. 16. MEEA-alumoxane has a lower ceramic yield (37%) than A-alumoxane (76%) and therefore results in a thinner more porous coating of the polymer beads that allows the volatiles to out-gas.

Figure 17:
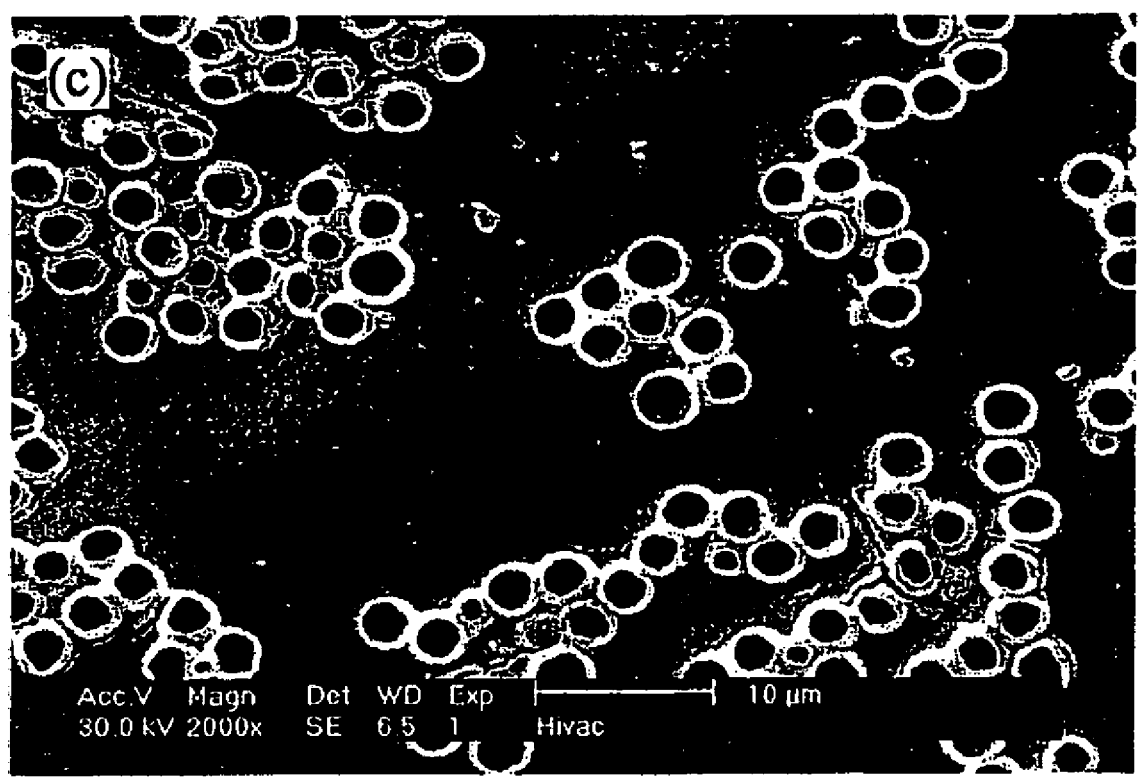
FIG. 17 is an SEM image of an asymmetric membrane.

Even though 10 wt % MEEA-alumoxane solutions produced a membrane with the desired macroscopic features, the average pore size of a membrane derived from this alumoxane is larger (10 nm) and has a large pore size distribution (5-30 nm) than membranes formed from A-alumoxane. Since the thickness of a flat membrane derived from 10 wt % MEEA-alumoxane was found to be similar to those made from a 1 wt % A-alumoxane, the latter may be used to provide uniformly small pore size and pore size distributions, shown in the SEM image in FIG. 17. The use of A-alumoxane results in a pore size of 7 nm as determined from BET measurements (defined below). The MWCO of the filter prepared using the A-alumoxanes gave an 80% rejection of molecular weights of between 9,000 and 10,000 $g.mol^{-1}$, corresponding to a pore diameters of >4 nm. Since the base membrane was prepared from A-alumoxane it is not as important to maintain the pore size of the membrane with the macroporous features with regard to molecular weight cut-off performance. A comparison of flux measurements will change by altering the alumoxane.

Figure 18:
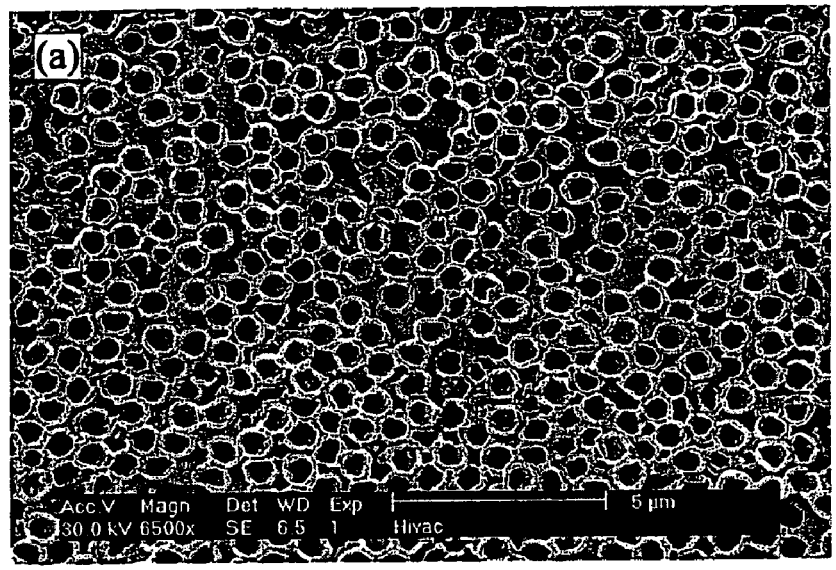
FIG. 18 is an SEM image of an asymmetric membrane.
Figure 19:
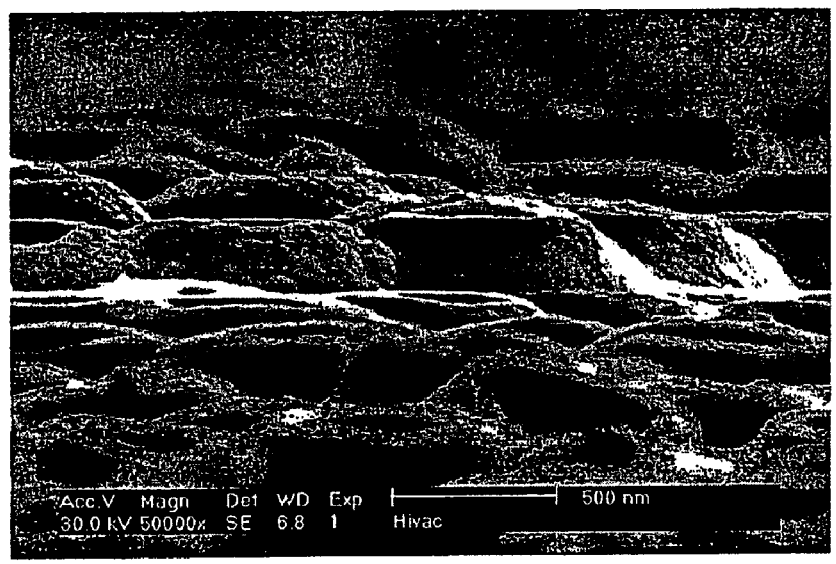
FIG. 19 is an SEM image of an asymmetric membrane.

As previously described, when the products from the pyrolysis of the polystyrene out-gas, the top of the coated spheres burst, resulting in a macroporous membrane in which the ceramic walls have a pore size defined by the alumoxane. The resulting "divots" resemble a honeycomb pattern, as shown in the SEM image in FIG. 18. An oblique view of these surface craters is shown in the SEM image in FIG. 19.

The structured array of the macroporous structured membrane is controlled by the size of the polystyrene beads. Membranes formed with the 0.75 µm polystyrene beads produced an evenly distributed honeycomb array. The macropores are spaced 100 nm apart, with the shell wall thickness corresponding to 1 µm. As the template diameter increases (i.e., larger polystyrene beads are used) the regularity of the array decreases. Presumably this is due to either the ease of packing or the decreased quantity of beads per volume (of solution) for the larger beads. Regardless of polystyrene bead size, the final ceramic wall thickness remains constant and is defined by the identity and concentration of the alumoxane solution.

FIG. 20 summarizes the flux and permeabilities achieved with the varied macro featured membranes. The flow, flux, and permeability are the highest for the membrane with the largest macroporous features. These membranes also exhibit the largest increase in the surface area. The membranes derived from MEEA-alumoxane showed higher flow rates than those derived from A-alumoxane due to the larger average pore size (10 nm) and broader pore size distribution (5-30 nm) of the MEEA-alumoxane derived macroporous features.

The efficiency, such as flow and permeability, of an ultrafiltration membrane can be improved by developing a hierarchical membrane, by increasing the surface area. This is of importance because ultrafiltration membranes have pore sizes down to 2 nm. Pore sizes of this diameter will inhibit the flow of a solution through the filter. Two methods to increase the surface area have been investigated, depositing hollow spheres in the membrane, forming a convex shaped membrane, or templating the membrane with polystyrene micro spheres forming a macroporous, concave, featured membrane. In both of these cases, the flow through the membrane increased. However, for the hollow spheres deposited into the membrane, those with the thinnest shell, increased the flow, compared to the "flat" membrane because the surface area has doubled. As the shell thickness increased, the flow through the membrane slowed to values less than the "flat" alumina membrane. The macroporous templated membrane also increased the flow through the membrane by doubling the surface area of the membrane. However, the flow cannot exceed the flow of the support, therefore, it is desirable for the values to approach the support values as close as possible.

The above discussion and Figures are meant to be illustrative of the principles and various embodiments of the present invention. Numerous variations and modifications will become apparent to those skilled in the art once the above disclosure is fully appreciated. It is intended that the following claims be interpreted to embrace all such variations and modifications. For example, the term "sphere" should not be interpreted to include only bodies that appear completely circular in all views, but to include bodies that are generally round. Sequential recitation of steps in the claims is not intended to require that the steps be performed sequentially, or that one step be completed before commencement of another step.

Measurement Apparatus and Techniques

SEM studies were performed on a Phillips XL-30 ESEM scanning microscope. The samples were attached to a metal mount using carbon tape. Due to the insulating nature of the materials, a thin layer of gold was applied as a coating to provide a conducting surface. Micro-indention testing was performed on a Micromet microhardness tester with a standard diamond tip. The size of the indentation (10 μm) is smaller than the size of the spheres and all indentions were made so as to minimize the effects of the curvature of the sphere. Hardness was determined by inserting the load weight and the area of indention into the Vicker's equation: $H_v=1.85444(P/d^2)$ where P is the load in kg and $d^2$ is the area of indention in $mm^2$. Five indentation measurements were performed on each sample with a loading time of 10 seconds per measurement. Powder X-ray diffraction patterns of A-alumoxane and metal-doped MEEA-alumoxane were determined by using a Siemens Diffractometer, with a scan area of 20-80 degrees, step size of 0.1 degrees, and count time of 10 seconds. Porosity, surface area, and pore volume were obtained using nitrogen adsorption/desorption techniques using a Coulter™ SA3100™. Helium was used to determine the free space in the sample tube and nitrogen as the absorbate gas. All samples were outgassed at 300° C. for 2 hours under a stream of dry nitrogen using a Coulter™ SAPrep™. Calculations were based on the cross sectional area of nitrogen using the value of 0.162 $nm^2$. Surface area was calculated using the BET (Brunauer, Emmett and Teller) equation with 5 data points. Pore volume calculation was performed at a relative pressure of 0.9814. Thermogravimetric/differential thermal analyses were obtained on a Seiko 200 TG/DTA instrument using a carrier gas of either dry nitrogen or air.

AFM images, grain size analysis, and surface roughness analysis of samples were obtained using a Nanoscope IIIa Scanning Probe Microscope (Digital Instruments, Santa Barbara, Calif.) in tapping mode. FESP tips were used with a pyramidal shape and end radius of 5-10 nm (Digital Instruments). Samples were attached to 15 mm magnetic specimen disks with carbon tape. Roughness and cross-section analysis were determined by the accompanying Nanoscope IIIa software.

Porosity, surface area, pore volume, and pore size distributions were obtained using a Coulter SA3100. Helium was used to determine the free space in the sample tube and nitrogen as the absorbate gas. All samples were out gassed at 300° C. for 2 hours under a stream of dry nitrogen using a Coulter SAPrep. Calculations were based on the cross sectional area of nitrogen using the value of 0.162 $nm^2$. Surface area was calculated using the BET (Brunauer, Emmett and Teller) equation with 5 data points. Pore size distributions were determined using the BJH (Barrett, Joyner, and Halenda) technique using 65 data points from the nitrogen adsorption isotherm (see S. J. Gregg, K. S. W. Sing, *Adsorption, Surface Area and Porosity*, 2nd Edition, Academic Press, London (1982), herein incorporated by reference). Pore volume calculation was performed at a relative pressure of 0.9814.

Pure water flux was measured on both the carboxylate-alumoxane derived filters and the hierarchical carboxylate-alumoxane derived filters at a pH close to the isoelectric point of alumina. Samples were placed in a Nalgene, model 300-4000 dead end filtration cell. A zero air tank was connected to the cell for pressure, and a regulator was used to maintain a constant pressure of 10 psi. Permeate was collected at atmospheric pressure, so that the pressure at the end of the regulator was equal to the transmembrane pressure. Permeate volume was measured over time to calculate flux and permeability.

While various preferred embodiments of the invention have been shown and described, modifications thereof can be made by one skilled in the art without departing from the scope of the invention. The examples described herein are merely illustrative, and are not limiting. For example, various polymers, carboxylate-alumoxanes, and metal dopants can be used. Likewise, the solvents, washes, and temperatures and pressures of the processing steps can be varied, so long as the desired composition is formed. Accordingly, the scope of protection is not limited by the description set out above, but is only limited by the claims that follow and includes all equivalents of the subject matter of the claims. In any method claim, the recitation of steps in a particular order is not intended to limit the scope of the claim to the performance of the steps in that order, or to require completion of one step prior to commencement of another step, unless so stated in the claim. For example, it will be understood that the drying and firing can be accomplished in a single process step and such an embodiment is intended to be within the scope of the present claims.

What is claimed is:

1. A method comprising propping open fractures in a subterranean formation with hollow, porous spheres of alumina or aluminate wherein the void volume is approximately 90% of the sphere volume and wherein the spheres have a hardness of at least 750 kg/mm$^2$ on the Vickers hardness scale.

2. The method of claim 1 wherein the spheres have a hardness of at least 1800 kg/mm$^2$ on the Vickers hardness scale.

3. The method of claim 1 wherein the spheres range from 1-80 microns in diameter.

4. The method of claim 2 wherein the spheres range from 1-80 microns in diameter.

5. The method of claim 1 wherein all or a portion of the spheres are contained within a polymer matrix composite.

6. The method of claim 5 wherein the composite is a reaction product of a resin and a hardener.

7. The method of claim 5 wherein the composite is an epoxy resin.

8. The method of claim 5 wherein the composite has a hardness greater than the hardness of the spheres.

9. The method of claim 5 wherein the spheres are surface functionalized.

10. The method of claim 1 wherein all or a portion of the spheres further comprise metal oxide.

11. The method of claim 5 wherein all or a portion of the spheres further comprise metal oxide.

12. The method of claim 1 wherein the spheres have a thickness of about 1 micron.

13. The method of claim 1 wherein the spheres are multi-layered.

14. The method of claim 1 further comprising flowing fluid from the formation through the pores of the spheres.

15. A wellbore fracture proppant comprising hollow, porous spheres of alumina or aluminate wherein the void volume is approximately 90% of the sphere volume and wherein the spheres have a hardness of at least 750 kg/mm$^2$ on the Vickers hardness scale.

16. The proppant of claim 15 wherein the spheres have a hardness of at least 1800 kg/mm$^2$ on the Vickers hardness scale.

17. The proppant of claim 15 wherein the spheres range from 1-80 microns in diameter.

* * * * *